United States Patent [19]

Rassekhi

[11] Patent Number: 5,419,612
[45] Date of Patent: May 30, 1995

[54] INFLATABLE SEAT ASSEMBLY

[76] Inventor: Andreas Rassekhi, 24440 Valencia Blvd., #3101, Valencia, Calif. 91355

[21] Appl. No.: 117,506

[22] Filed: Sep. 7, 1993

[51] Int. Cl.⁶ .............................................. B62J 1/26
[52] U.S. Cl. .................................. 297/200; 297/284.3; 297/452.41; 297/DIG. 3; 5/454; 5/456; 5/654
[58] Field of Search ............... 297/200, 284.3, 284.6, 297/452.41, DIG. 3, 284.1, 199; 5/454–456, 654

[56] References Cited

U.S. PATENT DOCUMENTS

| | | | |
|---|---|---|---|
| 484,367 | 10/1892 | Hicks . | |
| 566,344 | 8/1896 | Sager . | |
| 592,488 | 10/1897 | Ewbank, Sr. . | |
| 606,281 | 6/1898 | Plunkett . | |
| 612,552 | 10/1898 | Standeford | 297/200 |
| 633,142 | 9/1899 | Monahan . | |
| 2,938,570 | 5/1960 | Flajole . | |
| 2,961,033 | 11/1960 | Galbraith . | |
| 3,363,941 | 1/1968 | Wierwille | 297/284 |
| 3,540,776 | 11/1970 | Wilson | 297/253 |
| 3,652,126 | 3/1972 | Folling | 297/284 |
| 3,867,732 | 2/1975 | Morrell | 5/349 |
| 3,982,786 | 9/1976 | Burgin et al. | 297/284.3 |
| 4,190,286 | 2/1980 | Bentley | 297/284 |
| 4,504,089 | 3/1985 | Calvert et al. | 297/214 |
| 4,852,195 | 8/1989 | Schulman | 5/455 X |
| 4,893,367 | 1/1990 | Heimreid et al. | 5/454 X |
| 4,947,500 | 8/1990 | Seiler | 5/455 X |
| 4,957,286 | 9/1990 | Persons, II et al. | 272/73 |
| 5,020,852 | 6/1991 | Marion | 297/200 |
| 5,257,430 | 11/1993 | Yamaguchi | 5/454 |

FOREIGN PATENT DOCUMENTS

| | | | |
|---|---|---|---|
| 173360 | 5/1952 | Austria | 297/200 |
| 128534 | 12/1984 | European Pat. Off. | 297/284.6 |
| 3334864 | 4/1985 | Germany | 297/284.6 |
| 146287 | of 1895 | United Kingdom . | |

*Primary Examiner*—Peter R. Brown
*Attorney, Agent, or Firm*—Pretty, Schroeder, Brueggemann & Clark

[57] ABSTRACT

An inflatable bicycle seat or cover therefor having a plurality of independently inflatable cell assemblies, each of which is made up of one or more inflatable cells. The cell assemblies are connected to a fluid source so that the user can selectively adjust the degree of inflation of each individual cell assembly and, hence, the contour and support of the seat. The cells within each cell assembly are connected by a conduit that restricts fluid flow between cells within the assembly so that the seat will provide firm and stable support even under the forces generated in pedalling. A lightweight fluid source and controller valve are provided to permit selective adjustment of individual cell assemblies so that the contour and support characteristics can be adjusted to suit the individual requirements, from time to time, of the user.

27 Claims, 4 Drawing Sheets

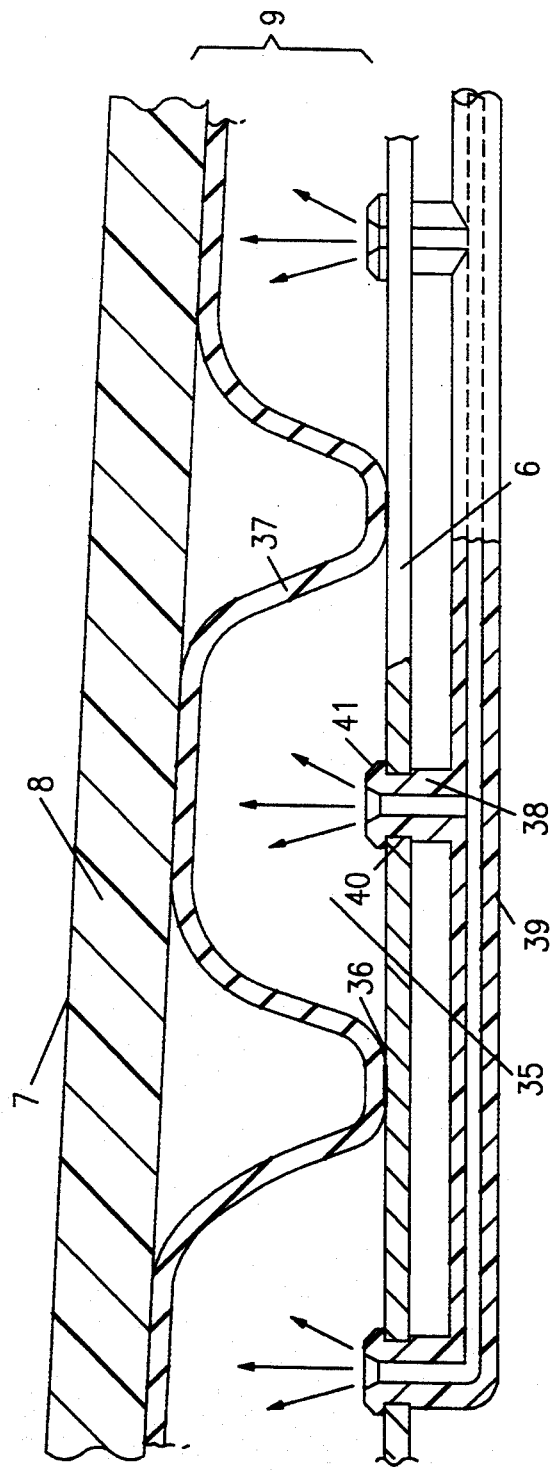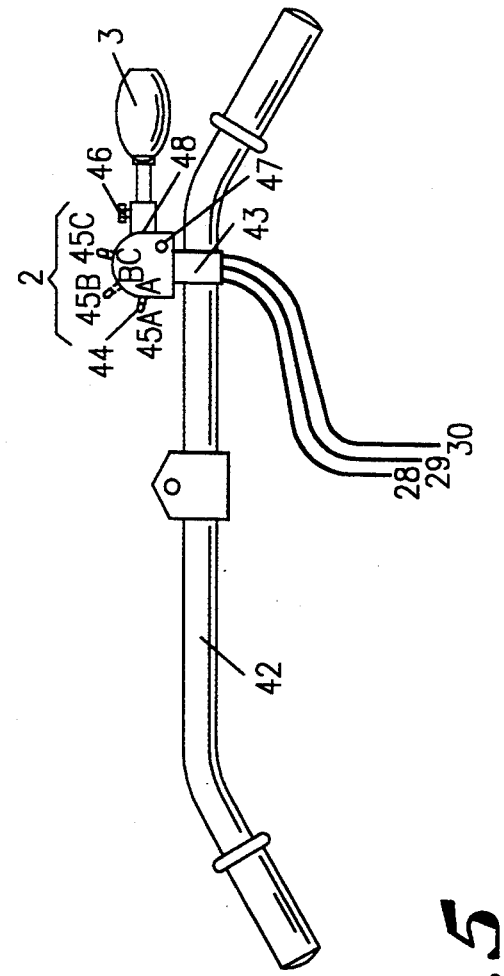

INFLATABLE SEAT ASSEMBLY

BACKGROUND OF THE INVENTION

The present invention relates generally to inflatable seats and, more particularly, to an inflatable seat for a bicycle or other application wherein there is a need to adjust the contour and support of the seat to suit the individual requirements of the user.

It is well known that one can experience considerable discomfort when using a seat for a substantial length of time. To some extent, this seat-related discomfort is due to inadequate or improper support of the buttocks and legs. In addition, because the contours of most seats generally are not adjustable, the user is unable to modify the seat to conform to his or her unique physical characteristics and personal preferences. Similarly, the user is unable to eliminate uncomfortable pressure points as they develop during use. These limitations give rise to substantial seat-related discomfort, particularly for those people who must remain seated for extended periods without recess, such as office workers, vehicle operators, and wheelchair users.

Seat-related discomfort can be exacerbated in a vehicle, such as a car, motorcycle, or tractor, due to the jarring and vibrations associated with the motion of the vehicle over the roadway surface or terrain. In particular cases, vibrations and jarring have been known to cause injury to the user. To some extent, these concerns are addressed by the use of shock absorbers or vibration dampening systems. However, some vehicles contain only limited vibration dampening capability. Thus, the users of such vehicles will experience more acute discomfort and a higher likelihood of seat-related injury. In vehicles that are manufactured with rigid frames, such as bicycles or wheelchairs, these effects will be even more pronounced.

The problems discussed above are particularly acute in vehicles, such as bicycles, exercise cycles, and the like, which are equipped with seats designed to facilitate the movement of a rider's legs in pedalling. Seats in these types of vehicles are generally smaller in size and more rigid than conventional seats. Consequently, the seat provides even less cushioning and support for the buttocks and legs of the user.

In the past, seat-related discomfort has been addressed by providing seats with additional padding, internal springs, or external cushions in order to provide a softer, more flexible surface. Additionally, seats have been outfitted with inflatable pads or cushions which could be adjusted to the user's preferred level of inflation. These inflatable seats and seat cushions aided in the reduction of vibrations and jarring associated with bicycle travel. Typically, such devices were composed of bags or tubes equipped with a valve so that a given tube could be connected to an air source and inflated, thereby altering the pressure of the tube and hence the resilience of the seating surface. Some of these designs could be inflated with a liquid in order to provide added resiliency.

Despite the improvements afforded, these inflatable seat designs are subject to a number of serious limitations. One such limitation is that the contour and support characteristics of these seats are inadequate and subject to variation. For example, when these seats are in use, the air flows away from the point of greatest pressure causing the inflatable tubes or bags to lose their shape. Further, a change in the user's position is accompanied by a corresponding change in distribution of air within the tube or bag. As a result, the user is subjected to shifting and sagging of the inflatable seat or cushion. Some designs attempted to remedy these deficiencies by including webbing within the tubes or bags. Nevertheless, such modifications have met with only limited success. In designs where individual tubes are connected in fluid communication with one another, air can flow out of the tube or bag subjected to the greatest amount of pressure and where the need for support is the greatest. As a result, these designs are subject to additional instability.

Moreover, existing inflatable seats have a limited range and variety of adjustments. Consequently, such seats cannot be adjusted to the precise contours and idiosyncracies of the anatomy or personal preferences of the individual user. Similarly, the user is unable to remove specific pressure points as they develop during extended use.

The application of these designs further is limited because they cannot be easily and economically altered or customized in an effort to adapt the seat to meet each individual's demands. Similarly, many of the seat cushion designs cannot be modified for production as part of the seat itself, nor can they be adapted for use in a seat cushion or seat cover. In other designs, such alterations can only be accomplished with considerable effort and expense.

The means employed to inflate and control inflatable seats also have limited application. In many designs, the level of inflation cannot be adjusted while the user is positioned on the seat. Consequently, the user must experiment by trial and error to achieve the proper seat inflation. In other designs, the seat can be adjusted while the seat is in use, but the means provided is awkward or inconvenient to use. Moreover, these control and adjustment mechanisms are often too expensive or bulky for certain applications.

In addition to these general considerations, it should be noted that pedal-operated vehicles have several seat-related considerations which have no counterpart in other types of seats. First, since the rider's legs must be able to move freely in order to facilitate pedalling, the rider's weight will concentrated primarily on the saddle portion of the seat. Consequently, the rider will experience considerable pressure on the perineum, the end of the spine, and the pelvic bones. In addition, the motion of the rider's legs and body gives rise to forces which are not present in the use of other types of seats. In pedal-operated devices, a substantial component of force is exerted in a direction normal to the seat surface. Consequently, the level of discomfort experienced by the rider is substantially greater than with a conventional seat. Further, in the extremes of the pedalling motion, as the rider's weight is shifted from one side to the other, the air or fluid in the inflatable pad is forced away from the points of greatest pressure and the pad tends to collapse and distort. As a result, the rider experiences a shifting or sagging of the seat's cushioning and support with each pedalling motion. The repeated nature of this effect is an independent source of discomfort for the rider.

Not surprisingly, many attempts have been made to provide these pedal-operated devices with inflatable seats or inflatable seat covers in order to alleviate the distinctive discomfort associated with their use. Due to the unique functional demands, however, these attempts have met with only limited success. Like their conventional seat counterparts, the contour and support characteristics of these seat designs are subject to variation. The extent and frequency of these variations, moreover, are magnified by the repeated motion of the rider and the substantial forces generated when pedalling.

From the foregoing, it will be appreciated that there is a need for an inflatable seat or cover therefor having contour and support characteristics that are adjustable over a wide range, yet one that provides firm and stable support for the user, particularly but not exclusively for pedal-operated devices such as bicycles. There is a further need for an inflatable seat or cover that can be combined with an inexpensive and lightweight fluid source and controller such that the contour and support characteristics can be selectively adjusted while the seat is in use. The present invention fulfills these and other needs.

SUMMARY OF THE INVENTION

Briefly, and in general terms, the present invention resides in an inflatable seat or seat cover having a plurality of independently inflatable cell assemblies, each of which is made up of one or more inflatable cells. In accordance with the invention, the cell assemblies can be connected to a fluid source so that the user can selectively adjust the degree of inflation of each individual cell assembly and, hence, the contour and support of the seat. The number, size, location, and arrangement of the cell assemblies, and the cells within the cell assemblies, can be varied in order to customize the contour and support characteristics of the seat. Moreover, the cell assemblies can be provided with cells of various shapes, sizes, or combinations thereof to permit adjustment over a wide range and variety of configurations, making the present invention particularly adaptable for bicycle seats and the like.

More specifically, and by way of example only, an inflatable seat or cover in accordance with the present invention includes a seat cushion comprising a flexible and resilient material in which two or more cell assemblies are formed, each assembly having at least one inflatable cell. The cushion can be permanently installed as part of the seat, or it can be designed to slip over an existing seat. Each cell assembly is inflatable independently of the other cell assemblies by a suitable source of fluid pressure. Within any cell assembly, each individual cell is connected to an adjacent cell in the assembly. The cells can be formed contiguously, in which event they can be interconnected through an opening between them, or the cells can be spaced apart and interconnected by a fluid conduit.

The cells within each cell assembly are connected in fluid communication with one another so that each cell is at a generally uniform pressure. However, in a further aspect of the present invention, the flow of fluid between cells within a given cell assembly is restricted so that the seat will provide firm and stable support even under the forces generated in pedalling. In addition, independently inflatable cell assemblies can be provided on alternate sides of the seat so that the fluid within the seat will not shift as the user's weight is shifted from one side to another while pedalling.

The inflatable seat of the present invention can be easily and economically combined with a controller and fluid source that are easy to operate and permit selective adjustment of individual cell assemblies so that the contour and support characteristics can be adjusted to suit the individual requirements, from time to time, of the user. The fluid supplied to the seat may be a gas or liquid, and the fluid source may be manually or automatically operated to supply this fluid to the cell assemblies. Moreover, the controller and fluid source may be operated while the seat while the seat is in use thereby permitting selective adjustment of the seating surface.

The present invention thus satisfies the need for an inflatable seat providing individualized control of contour and support in a design that has a simple construction and is economical to manufacture, lightweight, reliable, and easy to control and adjust in use. The foregoing and other advantages will become apparent from the following detailed description of the preferred embodiment, taken in conjunction with the accompanying drawings, which further illustrate by example the principles of the invention.

BRIEF DESCRIPTION OF THE DRAWINGS

FIG. 1 is a partial cross-sectional view of the presently preferred embodiment of the inflatable seat of the invention as incorporated into the seat of a bicycle, exercycle, or the like;

FIG. 3 is a partial cross-sectional view of a typical cell in its inflated condition and the cell conduit and inflation port through which the cell is inflated;

FIG. 5 is a perspective view of the pump bulb, controller, and connector conduits which provide for selective inflation of each cell assembly.

DESCRIPTION OF THE PREFERRED EMBODIMENT

Figure 1:
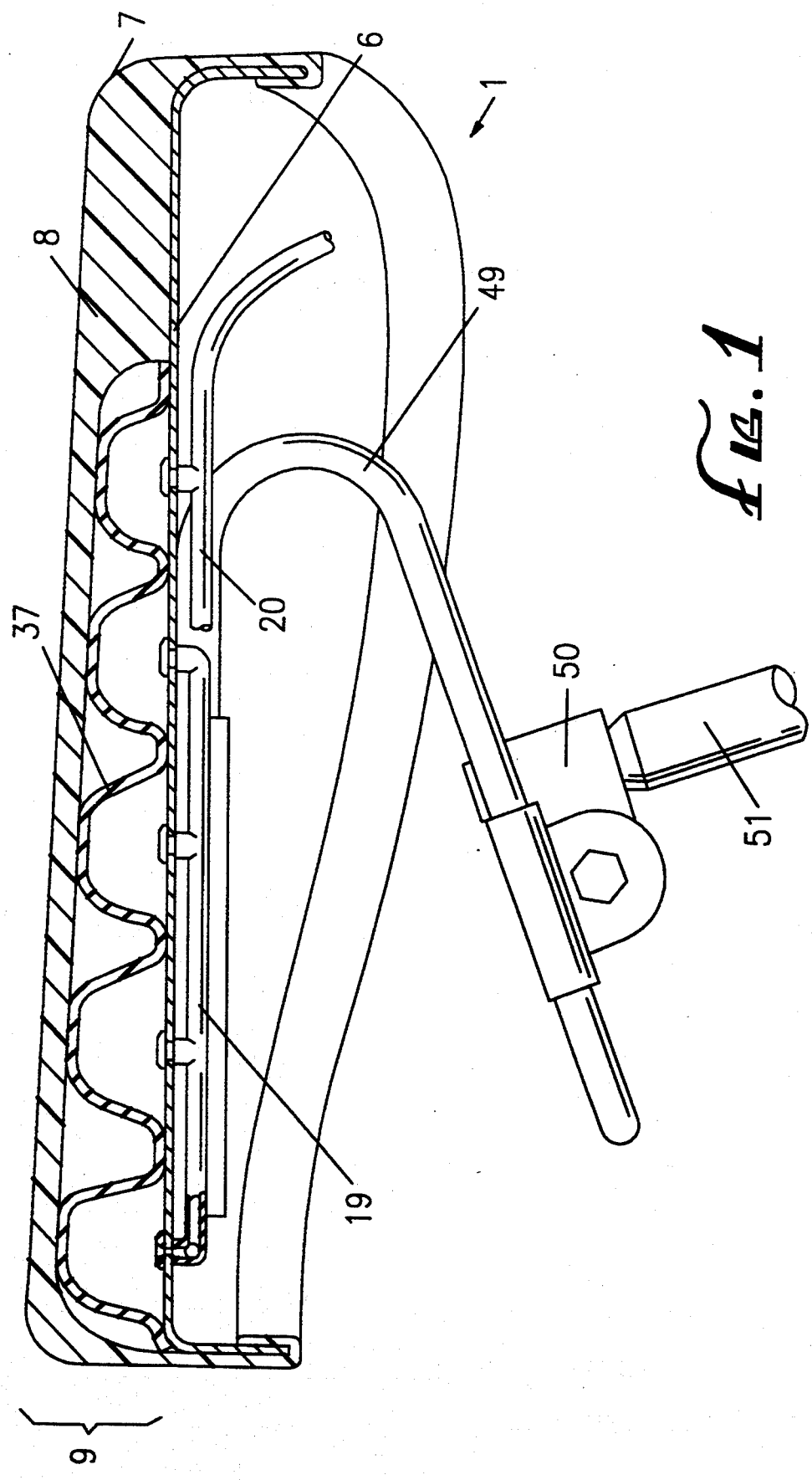
Figure 2:
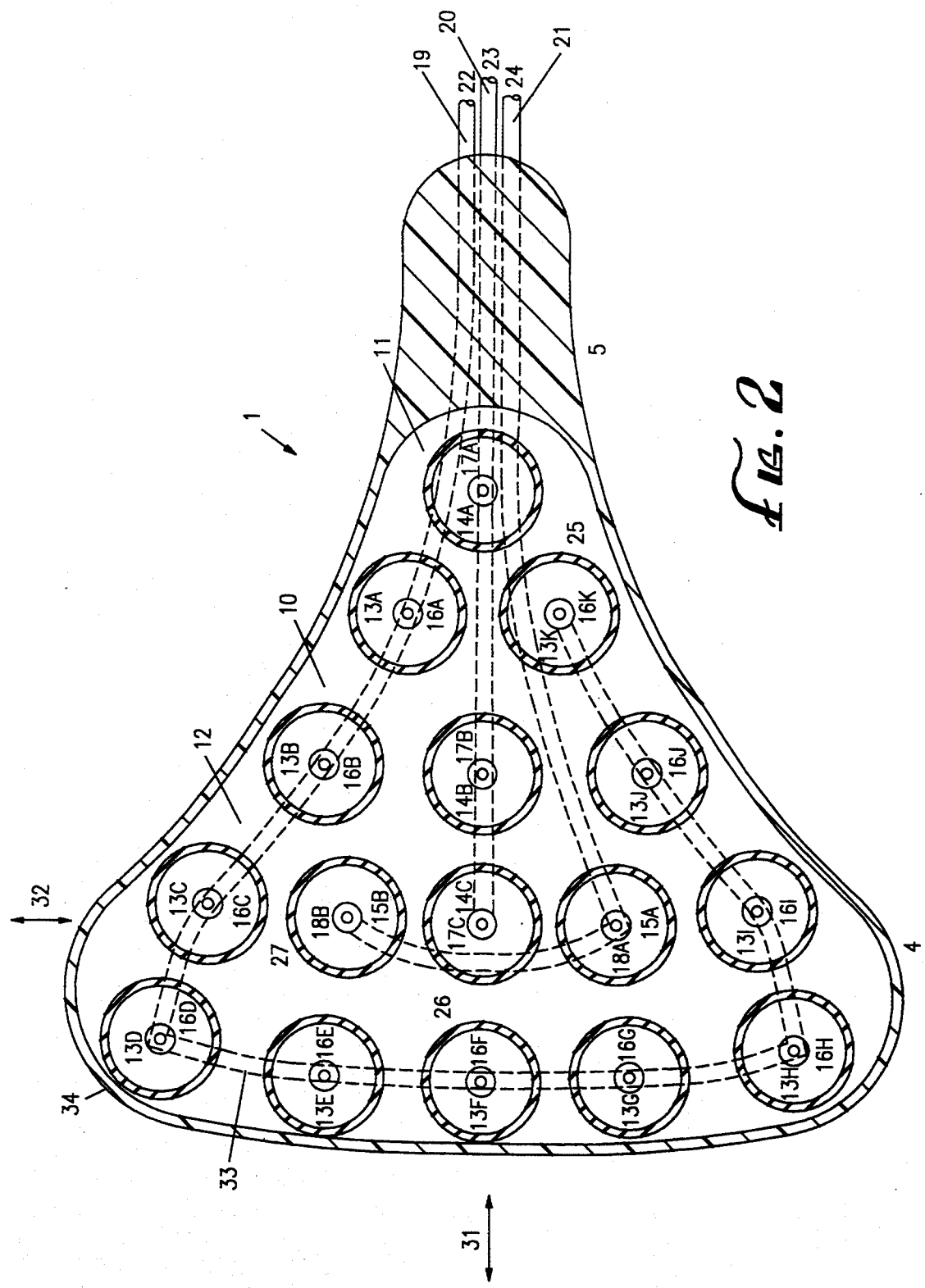
FIG. 2 is a top plan view of the inflatable seat of FIG. 1, illustrating the arrangement of the inflatable cells within the seat structure and the conduit connections which define each cell assembly.
Figure 4:
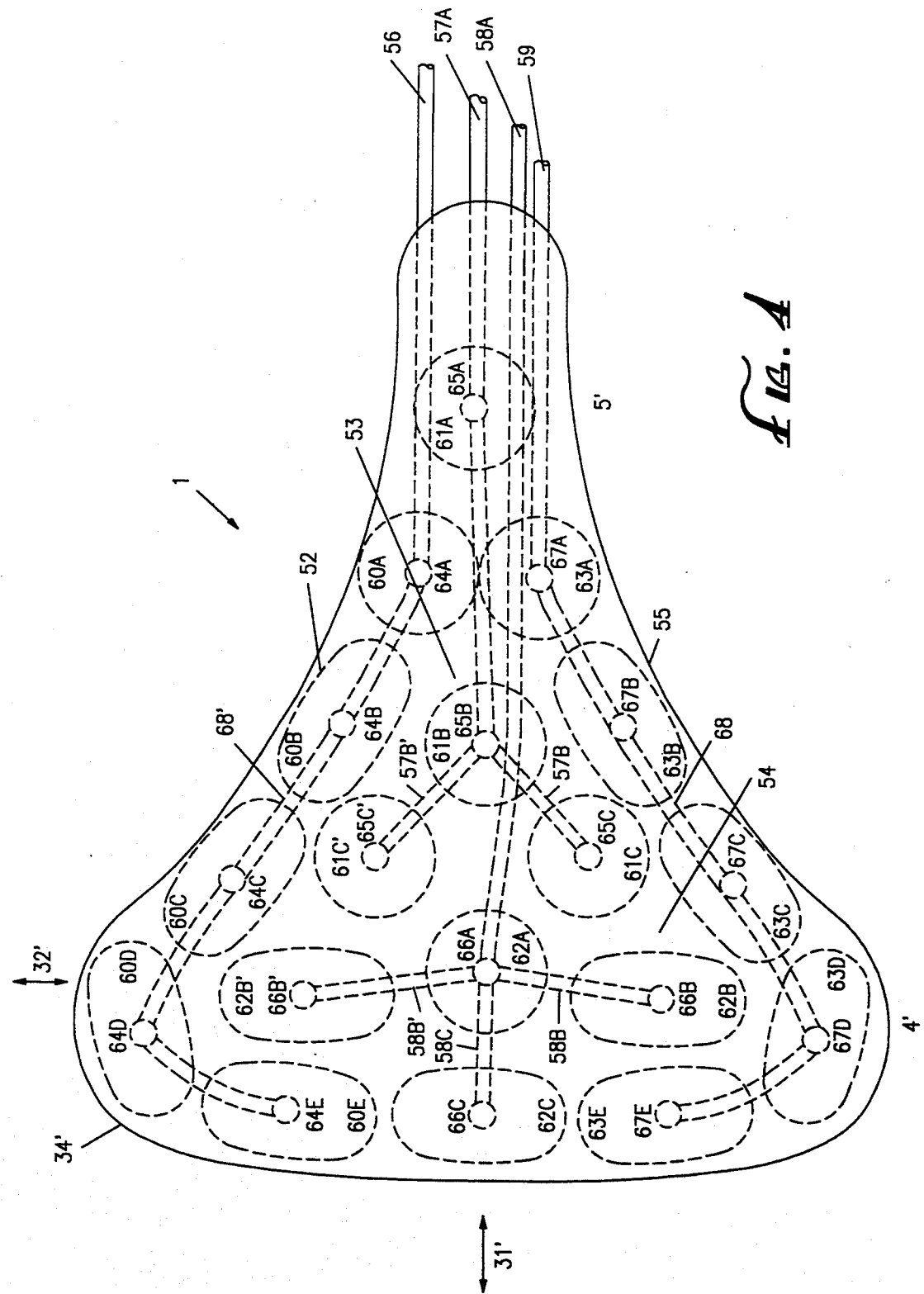
FIG. 4 ms a top plan view of an alternative embodiment of the inflatable seat illustrating the arrangement of inflatable cells of varying size and shape within the seat structure, the conduit connections which define each cell assembly, and the arrangement of hydrostatically-isolated cell assemblies on opposite sides of the seat.

Referring now to the drawings, and particularly to FIGS. 1, 2 and 4 thereof, there is shown by way of example an inflatable seat assembly constructed in accordance with the present invention, comprising a selectively inflatable bicycle seat, generally designated by the reference 1, connected in fluid communication with a controller 2 and pump bulb 3. The seat 1 has the same general shape as a conventional bicycle seat, with a generally broad saddle portion 4 and a narrower, elongated pommel portion 5 extending generally forward of and centrally from the saddle portion 4. It will be understood, however, that the present invention can be adapted to seats of varying shapes and configurations.

The seat 1 is comprised of a rigid seat base 6 and a flexible seat cover 7 attached to the seat base 6 which encloses seat-cushioning material 8 and an inflatable portion of the seat, generally designated by the reference 9. The pump bulb 3 functions as a fluid source which can be operated by the user to inflate the seat 1. In its inflated condition, the seat 1 provides protection from the jolting and vibrations associated with seat-related discomfort and injury.

In accordance with the invention, the controller 2 facilitates selective inflation of the seat 1 so as to adjust and adapt the contour and support characteristics of the seat 1 to each user's physical characteristics and personal preferences. In this regard, as best shown in FIG. 1 the inflatable portion 9 of the seat 1 is comprised of a plurality of independently and individually inflatable cell assemblies, 10, 11, and 12, which are comprised of one or more inflatable cells, 13a–k, 14a–c, and 15a–b, respectively, connected so that each inflatable cell is in fluid communication with at least one other cell in its assembly. As a result, each cell assembly is hydrostatically isolated from every other cell assembly and may be inflated independently of the others. Because the cells are in fluid communication, the pressure within each cell will be generally uniform throughout any given cell assembly. Consequently, the support characteristics of those regions of the seat associated a given cell assembly will also be generally uniform.

In the preferred embodiment, the seat 1 includes an inflatable portion 9 defined by the three cell assemblies 10, 11, and 12. Cell assembly 10 comprises inflatable cells 13a–k, inflation ports 16a–k, and cell conduit 19. Cell conduit 19 has a proximal end 22 and a distal end 25. The proximal end 22 is connected in fluid communication with the connector conduit 28 and the distal end 25 is attached to inflation port 16k. The cell conduit 19 is serially connected to inflation ports 16a–j at consecutive positions along the length of the conduit corresponding to the positions of cells 13a–13j.

Similarly, cell assembly 11 comprises inflatable cells 14a–c, inflation ports 17a–c, and cell conduit 20, having a proximal end 23 and distal end 26. The proximal end 23 is connected in fluid communication with the connector conduit 29 and the distal end 26 is attached to inflation port 17c. The cell conduit 20 is serially connected to inflation ports 17a–b at consecutive positions along the length of the conduit corresponding to the positions of cells 14a–14b.

Cell assembly 12 likewise comprises inflatable cells 15a–b, inflation ports 18a–b, and cell conduit 21 with a proximal end 24 and distal end 27. The proximal end 24 is connected in fluid communication with the connector conduit 30 and the distal end 26 is attached to inflation port 18b. The cell conduit 21 is connected to inflation port 17a at a position along the length of the conduit corresponding to the position of cell 15a.

The cells of each cell assembly are located throughout the seat interior in positions where they will provide support for the buttocks and legs, and cushion the perineum, the pelvic bones, and the end of the spine. In particular, cell assembly 10 is positioned generally around the outside perimeter of the seat, cell assembly 11 along the longitudinal line 31, and cell assembly 12 along a lateral line 32 generally in the saddle portion of the seat. So positioned, the cells in these cell assemblies provide protection from injurious shock and vibrations at these locations.

The positioning of the cells in the cell assemblies 10, 11, and 12 also enables the contour of the seat to be adjusted by varying the relative levels of inflation between the cell assemblies. More specifically, cell 13a, which is connected to the proximal end 22 of conduit 19, and cell 13k, which is connected at the distal end 25 of the conduit 19, are located on opposite sides of the longitudinal line 31 generally in the pommel portion 5 of the seat 1. The remaining cells 13b–j associated with cell assembly 10 are arranged generally equidistant along the line 33 parallel to and in proximity of the outer perimeter 34 of the seat 1. Cells 13a–c and 13i–k are located generally along the sides of the seat 1, and cells 13d–h are located generally along the rear of the seat. Cells 14a–c associated with cell assembly 11 are arranged generally along a longitudinal line 31 from the center of the pommel portion 5 to the center of the saddle portion 4 of the seat 1. The distal end 26 of the cell conduit 20 and inflatable cell 14c are located along the longitudinal line 31 in the saddle portion 4 of the seat. The proximal end 23 of the cell conduit 20 and inflatable cell 14a are located along the longitudinal line 31 in the pommel portion 5 of the seat 1. Inflatable cell 14b is located along the longitudinal line 31 in closer proximity to cell 14c. Finally, the cells 15a and 15b associated with cell assembly 12 are located along the lateral line 32 in the saddle portion of the seat 1 on opposite sides of the longitudinal line 31.

In the inflated condition, the inflatable portion 9 of the seat 1 defined by cell assemblies 10, 11, and 12 absorbs the jarring and vibration associated with use of the bicycle. By varying the level of inflation of the cell assemblies, the vibration dampening characteristics of the seat can be modified. Furthermore, by adjusting the level of inflation of each cell assembly the user can modify the resiliency and stability of the support provided in those areas of the seat 1 corresponding to each cell assembly. Preferably, the user will adjust the level of inflation to provide firm and stable support throughout the seat 1.

In the preferred embodiment, inflation of cell assembly 10 will raise the seating surface along the line 33. Similarly, inflation of cell assemblies 11 and 12 will raise the seating surface along the lines 31 and 32 respectively. Hence, by adjusting the relative levels of inflation of each cell assembly, the contour characteristics of the seat 1 will be modified to suit the user's physical characteristics and personal preferences.

It will be understood that the cell assemblies may be arranged in any convenient manner within the interior of the seat. Moreover, the number of cell assemblies and the number of cells within each cell assembly will vary depending upon the application. For example, the number of cells or cell assemblies may vary depending on the size of the seat, the overall contour, the range and magnitude of contour adjustment desired, and the personal preferences of the user, among others. Preferably, the cells will be sufficient in number and positioned so that, when inflated, they will provide cushioning and support in those regions of the seat in contact with the perineum, the end of the spine, and the pelvic bones. In addition, the number of cell assemblies and cells within each assembly will be sufficient to provide desirable support and vibration dampening characteristics while permitting selective adjustment of the contour characteristics of the seat to suit the user's unique physical characteristics and personal preferences.

As best shown in FIGS. 1 and 3, the inflatable portion 9 of the seat 1 is formed between the seat base 6 and the seat-cushioning material 8. A cell, designated generally by 35 in FIG. 3, is produced by forming a circular seal 36 between a cell casing 37 and the seat base 6. This seal 36 can be created by any conventional means, such as stitching, gluing, or heat sealing, that will provide sufficient attachment to withstand the pressures exerted on the seat 36 during normal use. The cell casing 37 is preferably a flexible elastomeric material so that the cell casing 37 will expand when pressure is applied through the inflation port, depicted generally by 38.

The size of the cell 35 will be determined by the size of the circular seal 36. It will be appreciated that different cell shapes and sizes may be provided by altering the shape and area enclosed by the seal 36. The cells 35 should be sufficiently large in cross-section to provide support to the rider and to cushion the rider from shock or vibration. The size of the cells, however, should be sufficiently small so that their overall shape is not significantly distorted under the pressures applied during normal use of the seat.

The cells within each cell assembly or in adjacent cell assemblies may be spaced apart from one another, as shown in FIG. 2, placed in close proximity, or combinations thereof. When the cells are spaced apart, additional seat cushioning material 8 may be placed within the gaps or spaces between the cells thereby providing additional stability and cushioning to the seat.

As best shown in FIGS. 2 and 3, the cell conduit 39 is a continuous cylindrical hollow tube that is attached at one end to the connector conduit 28, 29, or 30 and at the other end to the seat 1. The connector conduits 28, 29, and 30 are continuous cylindrical hollow tubes that are attached at one end to the cell conduits 19, 20, and 21, respectively, and at the other to the controller 2. The conduits may be formed of any suitable material, such as plastic, that can withstand the application of pressure inside the conduits without leakage or distortion. At selected points along the length of the cell conduit 39 corresponding to the locations of the cells 35 in the cell assembly, inflation ports 38 are provided. These inflation ports 38 are sized and shaped to intimately engage and form an airtight seal against the edges of the aperture 40 provided in the seat base 6. Furthermore, the inflation port 38 is provided with a clip 41 which engages the upper portion of the seat base 6 so that the inflation port is lockingly coupled to the seat base 6.

In the preferred embodiment, the cell conduits 19, 20, and 21 are sized and shaped to restrict or inhibit the flow of air from one cell to another when pressure is exerted upon an individual cell or set of cells within the cell assembly during normal use. In general, smaller cell conduit diameters inhibit the flow of fluid between cells. In addition, smaller inflation port diameters inhibit the flow of fluid between cells. Alternatively, each cell to cell connection could be fitted with a valve that restricts the flow of fluid between cells.

It will be appreciated that the conduit 39 can be formed of a single continuous tube or, alternatively, of several individual tubes connected together. Furthermore, it will be appreciated that the conduit 39 and inflation ports 38 could be formed integrally with the seat base 6. It will also be appreciated that the cells could be formed independently from the seat base 6 and connected in fluid communication with a cell conduit 39 through the apertures 40 provided in the seat base 6.

In the embodiment shown in FIG. 4, the seat 1' includes an inflatable portion defined by four cell assemblies 52, 53, 54, and 55. In cell assembly 52, the cell conduit 56 is serially connected to inflation ports 64a–e at consecutive positions along the length of the conduit corresponding to the positions of cells 60a–e. Similarly, in cell assembly 55, cell conduit 59 is serially connected to inflation ports 67a–e at consecutive positions along the length of the conduit corresponding to the positions of cells 63a–e. In cell assembly 53, cell conduit 57a is connected in fluid communication with inflation ports 65a and 65b and cell conduits 57b and 57b' which, in turn, are connected in fluid communication with inflation ports 65c and 65c', respectively. Meanwhile, in cell assembly 54, cell conduit 58a is connected in fluid communication with inflation port 66a and cell conduits 58b, 58b', and 58c which are connected in fluid communication with inflation ports 66b, 66b' and 66c, respectively. The seat 1' also contains cells of various shapes. In particular, cells 60a, 65a, 65b, 65c, 65c', 66a, and 67a are generally circular in cross-section while cells 60b–e, 62b, 62b', 62c, and 67b–e are generally oval in cross-section.

Taken as a whole, these alterations change the overall contour and the range and magnitude of contour adjustment available to the user. In addition, the embodiment illustrated in FIG. 4 provides an additional advantage to the user. In this embodiment, the cells 60a–e of cell assembly 52 are positioned generally equidistant along the line 33' parallel to and in proximity to the outer perimeter 34' of the seat 1'. The cells 63a–e of cell assembly 55 are similarly positioned on the opposite side of the longitudinal line 31'. Hence, cell assemblies 52 and 55 are hydrostatically isolated from each other and the fluid within each cell assembly cannot be communicated from one side of the seat to the other. As a result, the support characteristics of the seat do not shift as the user's weight is shifted during pedalling.

As best shown in FIG. 5, the inflatable portion 9 of the seat 1 (not shown) is connected in fluid communication with a controller 2 through connector conduits 28, 29, and 30. The controller 2 is attached to the handlebar 42 of the bicycle with clamp 43. The controller is comprised of a selector 44, an exhaust valve 46, a control valve 47, and a supply port 48. The controller 2 is in fluid communication with a pump bulb 3 through supply port 48 which serves as a source of fluid for inflation of the cell assemblies, 10, 53, and 12.

The selector 44 is operable between a plurality of positions 45a, 45b, and 45c whereby the fluid source and controller are connected in fluid communication with connector conduits 28, 29, and 30, respectively. The control valve 47 operable between a first position in which the valve permits fluid flow and a second position in which fluid flow is restricted. The exhaust valve 46 is adjustable over a continuous range from a closed position in which fluid flow is not permitted to an open position in which fluid flow is freely permitted.

Selective inflation of the cell assemblies 10, 11, and 12 is accomplished by use of the controller and pump bulb 3. In order to inflate a particular cell assembly 10, 11, or 12, the exhaust valve 46 is preferably in its closed position and the control valve 47 is in its open position. By adjusting the selector to a particular position, 45a, 45b, or 45c, the pump is thereby placed in fluid communication with the controller 2 and the corresponding connector conduit, 28, 29, and 30 respectively. The pump bulb 3 is operated by the user to inflate the cell assembly. Thereafter, the selector position may be changed to facilitate inflation of a different cell assembly. After selective inflation has been completed, the control valve 47 may be placed in its closed position thereby preventing the return of inflating fluid and isolating the controller 2 from the inflatable seat 1.

It is particularly desirable to inflate each of the cell assemblies independently and to control the amount of inflation when the chamber is being inflated. Alternatively, the level of inflation can be modified by releasing or venting the inflating fluid after the cell assembly has been inflated. In the preferred embodiment, this can be accomplished by placing the control valve 47 in its open position and opening the exhaust valve 46 to release air to the atmosphere. When the desired amount of air has been released, the exhaust valve 46 and control valve 47 are preferably placed in their closed positions.

It should be noted that the controller may be located at any convenient point, relative to the seat. For example, in the case of a bicycle it may be conveniently located on the handle bars. Alternatively, it may be attached to other portions of the equipment. In addition, the controller may be combined with other devices employed in connection with the equipment, such as pressure gauges, pulse rate indicators, speedometers, and elapsed time indicators, among others. It will also be appreciated that the control valve 47 may be located at any point in the pneumatic train comprising the cell assembly, the connector conduit, the controller and the pumping bulb. For example, it can be located between the pumping bulb 3 and the selector 44, between the selector 44 and the cell assembly 10, 11, or 12, as shown in FIG. 4, or at the end of the connector conduit. The pump bulb 3 is of conventional construction and would typically be provided with an opening to the atmosphere, such as a one-way valve, through which air could be drawn for inflation of the cell assemblies.

In general it is anticipated that the fluid used for inflating individual cell assemblies will be air and that the fluid source will be the pump bulb 3. Alternatively, air could be supplied to the seat by a motorized pump or pressurized air could be supplied from tanks or cylinders. Moreover, the inflating fluid could be a different gas or a liquid such as water or hydraulic fluid, among others.

It will be appreciated that each of the cell assemblies could be provided with a valve connected to the proximal ends 22, 23, and 24 of each cell conduit 19, 20, and 21 through which the cell assemblies 10, 11, and 12 could be inflated and deflated as required. This valve could be of the type that permits connection of the cell assembly to a conventional tire pump for inflation of the cell assemblies.

Referring again to FIG. 1, the seat 1 is generally of conventional construction. FIG. 1 shows by way of example, the use of with a bent double spring fork 49 which is connected to a clamp holder 50 which is removably mounted on the seat-connecting post 51 of a bicycle (not shown), however, the present invention contemplates the use of any number of seat-mounting assemblies, as with any other conventional bicycle seat.

The seat cushioning material is shown generally above the inflatable portion 9 of the seat 1, but may also encapsulate it. The seat cushioning material 8 and the inflatable portion 9 of the seat 1 are located generally over and supported by the seat base 6 which is connected to the bent double spring fork 49. Alternatively, use of the seat-cushioning material 8 may be limited to selected areas of the seat or eliminated altogether.

The seat cover 6 may be formed of any flexible material which can accommodate deformation and stretching. The seat cushioning material 8 may be padding, such as upholstery padding or wadding, or it may be a foam material, synthetic foams being especially desirable, including particularly materials such as polyurethane foams. The seat base 6 may be of conventional construction, forming a rigid support for the inflatable portion 9 of the seat 1 and the seat-cushioning material 8.

Cells 61a, 61b, 62a, and 62c are located along the longitudinal line 31' from the pommel portion 5' to the saddle portion 4' of the seat 1'. Cell 61c is located generally in the saddle portion of the seat 1' on the opposite side of the longitudinal line 31' from cell 61c'. Finally, the cells 62b and 62b' associated with cell assembly 54 are located along the lateral line 32' in the saddle portion of the seat 1' on opposite sides of the longitudinal line 31.

In addition, the alternative embodiment illustrates the use of cells of various shapes within a given cell assembly.

While inflatable bicycle seats have been illustrated, it is to be understood that the invention has application to other types of seats, for example, on stationary exercise cycles, motorcycles, rowing machines, wheelchairs, tractors, automobiles, airplanes, boats, and office chairs, among others. It will also be understood that, while the invention can be furnished as original equipment with the seat as manufactured, it also lends itself to retrofitting of existing seats, such as by incorporating the invention in a seat pad, cover, or cushion.

Although a particular form of the invention has been illustrated and described, it will be apparent that various modifications can be made without departing from the spirit and scope of the invention. With respect to the description set forth above, it will be appreciated that the optimum dimensional relationships for the parts embodying the invention, to include variations in size, materials, shape, form, function, and manner of operation, assembly and use, are deemed readily apparent and obvious to one skilled in the art. Accordingly, the invention is to be defined only by the appended claims.

What is claimed is:

1. An inflatable seat for a bicycle or the like, comprising:

a seat with a broad saddle portion and a narrower pommel portion extending generally forward of and centrally from the saddle portion;

a rigid seat base connected to and supporting the seat; and a flexible seat cover overlying the seat, the seat cover having a plurality of independently inflatable cell assemblies formed therein, each of the cell assemblies including one or more inflatable cells and at least one of the cell assemblies including two or more inflatable cells, each of which cells is in fluid communication with at least one other cell in that cell assembly, and a conduit interconnecting the cells in each cell assembly whereby each cell is in fluid communication with at least one other cell wherein the conduit has a cross-sectional area substantially smaller than the cross-sectional area of the cells so as to restrict the communication of fluid between the cells.

2. An inflatable seat as set forth in claim 1, wherein each cell assembly includes two or more inflatable cells.

3. An inflatable seat as set forth in claim 1, and further including:

means for connecting each cell assembly to a source of fluid pressure.

4. An inflatable seat as set forth in claim 1, wherein each cell is generally spaced apart from every other cell in each cell assembly.

5. An inflatable seat as set forth in claim 1, wherein the cells are interconnected serially in each cell assembly.

6. An inflatable seat as set forth in claim 1, wherein the seat contains at least two cell assemblies and the cells of one cell assembly are positioned on a first side of the seat and the cells of another cell assembly are positioned on a second side of the seat so as to restrict the communication of fluid from the first side of the seat to the second side of the seat.

7. An inflatable seat as set forth in claim 1, wherein the seat cover includes at least three cell assemblies.

8. An inflatable seat as set forth in claim 7, wherein each cell assembly includes at least two cells, each cell generally spaced apart from every other cell in the cell assembly.

9. An inflatable seat as set forth in claim 8, wherein the inflatable cells of a first cell assembly are disposed generally equidistant along the perimeter of the saddle portion of the seat, wherein the inflatable cells of a second cell assembly are disposed generally equidistant along a longitudinal line from the front to the rear of the seat, and wherein the cells of a third cell assembly are disposed generally along a lateral line in the saddle portion of the seat.

10. An inflatable seat as set forth in claim 9, wherein the cells positioned in proximity to the saddle portion of the seat are larger than the cells positioned in proximity to pommel portion of the seat.

11. An inflatable seat for a bicycle or the like, comprising:
a seat with a broad saddle portion and a narrower pommel portion extending generally forward of and centrally from the saddle portion;
a rigid seat base connected to and supporting the seat; and
a flexible seat cover overlying the seat, the seat cover having at least three independently inflatable cell assemblies formed therein, each of the cell assemblies including one or more inflatable cells and at least one of the cell assemblies including two or more inflatable cells, each of which cells is in fluid communication with at least one other cell in that cell assembly.

12. An inflatable seat as set forth in claim 11, wherein each cell assembly includes at least two cells, each cell generally spaced apart from every other cell in the cell assembly, and further including:
a conduit for interconnecting the cells in each cell assembly, whereby each cell is in fluid communication with at least one other cell.

13. An inflatable seat as set forth in claim 12, wherein the inflatable cells of a first cell assembly are disposed generally equidistant along the perimeter of the saddle portion of the seat, wherein the inflatable cells of a second cell assembly are disposed generally equidistant along a longitudinal line from the front to the rear of the seat, and wherein the cells of a third cell assembly are disposed generally along a lateral line in the saddle portion of the seat.

14. An inflatable seat as set forth in claim 13, wherein the cells positioned in proximity to the saddle portion of the seat are larger than the cells positioned in proximity to pommel portion of the seat.

15. An inflatable seat for a bicycle or the like, comprising:
a seat with a broad saddle portion and a narrower pommel portion extending generally forward of and centrally from the saddle portion;
a rigid seat base connected to and supporting the seat; and
a flexible seat cover overlying the seat, the seat cover having a plurality of independently inflatable cell assemblies formed therein, wherein each of the cell assemblies including one or more inflatable cells and further wherein at least one of the cell assemblies includes at least two inflatable cells in fluid communication with each other through a passageway having a cross-sectional area substantially smaller than the cross-sectional area of the cells so as to restrict the communication of fluid between the cells.

16. An inflatable seat as set forth in claim 15, wherein each cell assembly includes two or more inflatable cells.

17. An inflatable seat as set forth in claim 15, and further including:
means for connecting each cell assembly to a source of fluid pressure.

18. An inflatable seat as set forth in claim 15, wherein each cell is generally spaced apart from every other cell in each cell assembly.

19. An inflatable seat as set forth in claim 15, and further including:
a conduit interconnecting the cells in each cell assembly whereby each cell is in fluid communication with at least one other cell.

20. An inflatable seat as set forth in claim 15, wherein the cells are interconnected serially in each cell assembly.

21. An inflatable seat as set forth in claim 15, wherein the seat cover includes at least three cell assemblies.

22. An inflatable seat as set forth in claim 21, wherein each cell assembly includes at least two cells, each cell generally spaced apart from every other cell in the cell assembly, and further including:
a conduit for interconnecting the cells in each cell assembly, whereby each cell is in fluid communication with at least one other cell.

23. An inflatable seat as set forth in claim 22, wherein the inflatable cells of a first cell assembly are disposed generally equidistant along the perimeter of a saddle portion of the seat, wherein the inflatable cells of a second cell assembly are disposed generally equidistant along a longitudinal line from the front to the rear of the seat, and wherein the cells of a third cell assembly are disposed generally along a lateral line in the saddle portion of the seat.

24. An inflatable seat as set forth in claim 23, wherein the cells positioned in proximity to the saddle portion of the seat are larger than the cells positioned in proximity to a pommel portion of the seat.

25. An inflatable seat as set forth in claim 15, wherein the seat contains at least two cell assemblies and the cells of one cell assembly are positioned on a first side of the seat and the cells of another cell assembly are positioned on a second side of the seat so as to restrict the communication of fluid from the first side of the seat to the second side of the seat.

26. An inflatable seat as set forth in claim 15 wherein the passageway is a conduit having a cross-sectional area substantially smaller than the cross-sectional area of the cells so as to restrict the communication of fluid between the cells.

27. An inflatable seat as set forth in claim 15 wherein the passageway is a port having a cross-sectional area substantially smaller than the cross-sectional area of the cells so as to restrict the communication of fluid between the cells.

* * * * *